United States Patent
Wang et al.

(10) Patent No.: US 7,933,323 B2
(45) Date of Patent: Apr. 26, 2011

(54) METHOD AND SYSTEM FOR PERFORMING TIMING RECOVERY IN A DIGITAL COMMUNICATION SYSTEM

(75) Inventors: Peiqing Wang, Irvine, CA (US); Mehmet V. Tazebay, Irvine, CA (US); Scott Powell, Carlsbad, CA (US)

(73) Assignee: Broadcom Corporation

( * ) Notice: Subject to any disclaimer, the term of this patent is extended or adjusted under 35 U.S.C. 154(b) by 1003 days.

(21) Appl. No.: 11/537,108

(22) Filed: Sep. 29, 2006

(65) Prior Publication Data

US 2008/0080606 A1 Apr. 3, 2008

(51) Int. Cl.
H03K 5/159 (2006.01)
(52) U.S. Cl. ........................................ 375/229
(58) Field of Classification Search .......... 375/229–236, 375/240.18; 333/18, 28 R; 708/300, 322, 708/323, 404, 405; 379/340, 398, 406.13; 342/196; 370/210
See application file for complete search history.

(56) References Cited

U.S. PATENT DOCUMENTS

| | | | | |
|---|---|---|---|---|
| 6,252,902 B1* | 6/2001 | Simeon et al. | ................ | 375/222 |
| 2003/0021365 A1* | 1/2003 | Min et al. | ...................... | 375/343 |
| 2005/0058193 A1* | 3/2005 | Saed | ............................. | 375/232 |
| 2007/0053417 A1* | 3/2007 | Nagata et al. | ................. | 375/147 |
| 2007/0071152 A1* | 3/2007 | Chen et al. | .................... | 375/355 |

* cited by examiner

*Primary Examiner* — Sam K Ahn
(74) *Attorney, Agent, or Firm* — McAndrews, Held & Malloy, Ltd.

(57) ABSTRACT

Processing signals in a digital communication may include equalizing a signal in a timing-recovery system using a frequency domain equalizer. The frequency domain equalizer may be a frequency domain adaptive filter that adapts using a least-mean-square algorithm where at least one tap-weight that corresponds to a pre-cursor may be constrained to zero. The processing may include recovering timing information using a Mueller/Muller timing recovery algorithm that may be aided by using a pre-filter before the equalizer.

21 Claims, 9 Drawing Sheets

METHOD AND SYSTEM FOR PERFORMING TIMING RECOVERY IN A DIGITAL COMMUNICATION SYSTEM

CROSS-REFERENCE TO RELATED APPLICATIONS/INCORPORATION BY REFERENCE

Not Applicable.

FIELD OF THE INVENTION

Certain embodiments of the invention relate to a method for processing signals in a communication system. More specifically, certain embodiments of the invention relate to a method and system for performing timing recovery in a digital communication system.

BACKGROUND OF THE INVENTION

Transmission of digital information presents many challenges. One issue concerns recovering timing information about the transmitted signal. This is necessary in order to properly sample the signal at the receiver. Some other issues are related to the effects produced on the signal as a result of the channel characteristics. The channel in a digital communication system may be characterized as a filter with a limited bandwidth. As a result, a square wave pulse inserted at a transmit end of the channel suffers from roll-off at a receiving end of the channel. In addition, the channel may also be plagued with multipath issues that manifest themselves as reflections of the original signal being added to the original signal. As a result of these characteristics, there may be a significant amount of inter-symbol-interference (ISI) seen at the receiving end of the channel. That is the individual symbols or bits begin to overlap one another as a result of reflections and roll-off produced by the band limiting and other effects of the channel.

To compensate for the effects of the channel an equalizer may be used. The equalizer may be based on a finite-impulse-response (FIR) filter adapted by a least mean squares technique (LMS). This is sometimes referred to as the time-domain LMS technique. This technique may have the advantage of operating without imposing any significant delay between the input and output signal. However, this quick response time is obtained at the expense of a computationally demanding process that becomes more demanding as the data rates increase.

When the data rates are higher, for example in the 10 Gbit/sec range, the time-domain LMS technique may become too computationally demanding and perhaps too costly. One method for dealing with the issue may be to perform the equalizer function in the frequency-domain rather than in the time-domain. A method that employs this technique is the constrained frequency domain block LMS algorithm. The problem with this technique, however, is that it does not have any constraint for the pre-cursor. It will therefore, adapt the pre-cursor tap-weight as other tap-weights. This will result in a non-zero contribution during the frequency domain FIR computation and will thus result in the loss of accurate timing error information that could be derived based on the zero-crossing at the pre-cursor that is introduced by the pre-filter.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for processing signals in a communication system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method for processing signals in a communication system. Exemplary aspects of the invention may comprise equalizing a signal with a timing-recovery system using a frequency domain equalizer. The frequency domain equalizer may be a frequency domain adaptive filter that adapts using a least-mean-square algorithm where at least one tap-weight's adaptation that corresponds to a pre-cursor may be constrained to zero. The processing may include recovering timing information using a Mueller/Muller timing recovery algorithm that may be aided by using a pre-filter before the adaptive equalizer.

Figure 1:
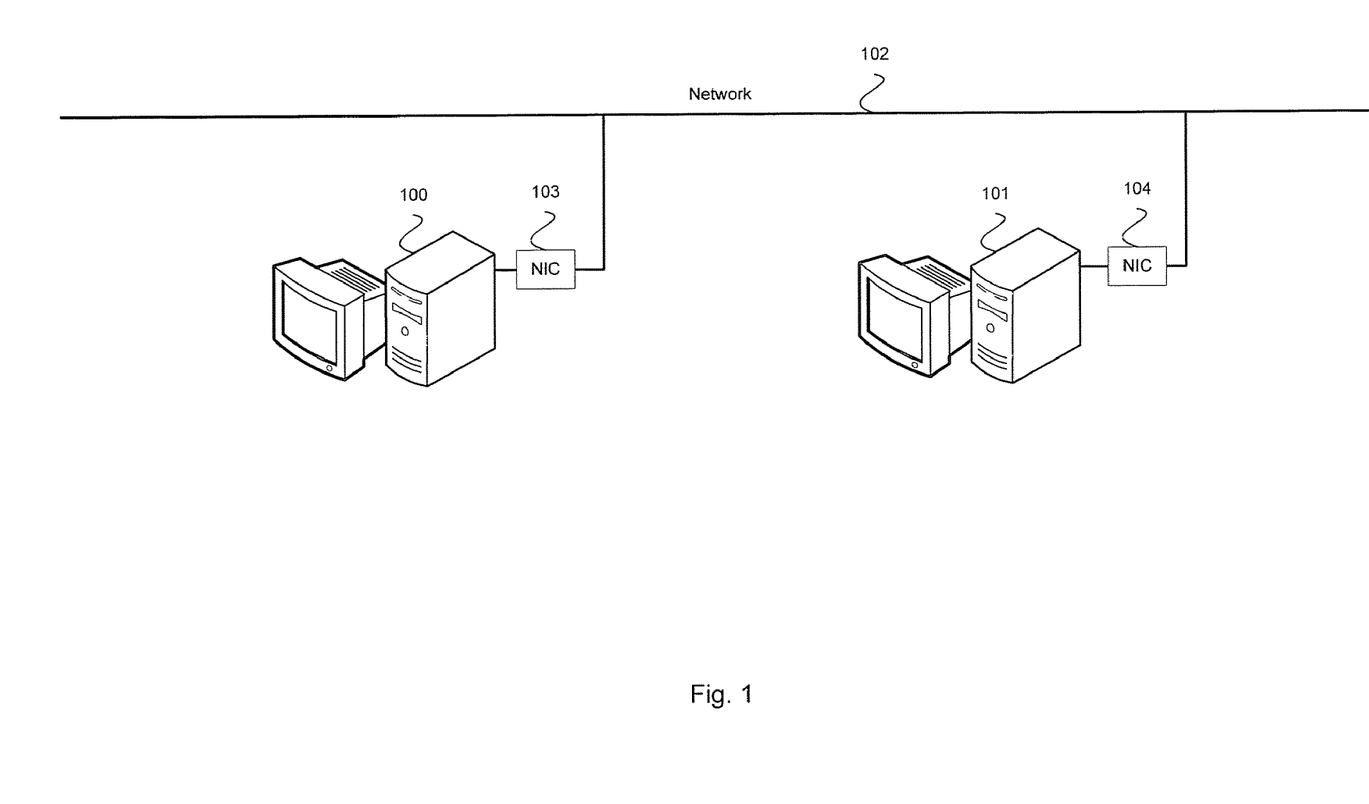
FIG. 1 is a diagram of two computers communicating over a network, which may be utilized in connection with an embodiment of the invention.

FIG. 1 is a diagram of two computers communicating over a network, which may be utilized in connection with an embodiment of the invention. Referring to FIG. 1, shown are two computers 100 and 101, a network connection 102, and two network interface cards 103 and 104. The computers 100 and 101 may comprise suitable logic, circuitry, and/or code that may enable transmitting and receiving data over a network. For example, each computer may comprise a network interface card 103 and 104 for transmitting and receiving data. The network interface cards may comprise suitable logic, circuitry, and/or code for communicating data from the computers 100 and 101 over the network 102.

In operation, data communicated over the network 102 may become distorted. The amount of distortion may be related to the type of medium used. For example, the data communicated may become more distorted when an unshielded network cable is used because the unshielded cable may be more susceptible to outside interference than a shielded cable. The amount of distortion may also be related to the distance between computers 100 and 101. As the amount of distortion increases, it may become necessary for a receiving network interface card 103 and 104 to compensate for the signal distortion. In addition, the receiving network interface card 103 and 104 may have to recover timing information about the signal communicated. The invention disclosed herein is a novel approach for dealing with these issues.

Figure 2:
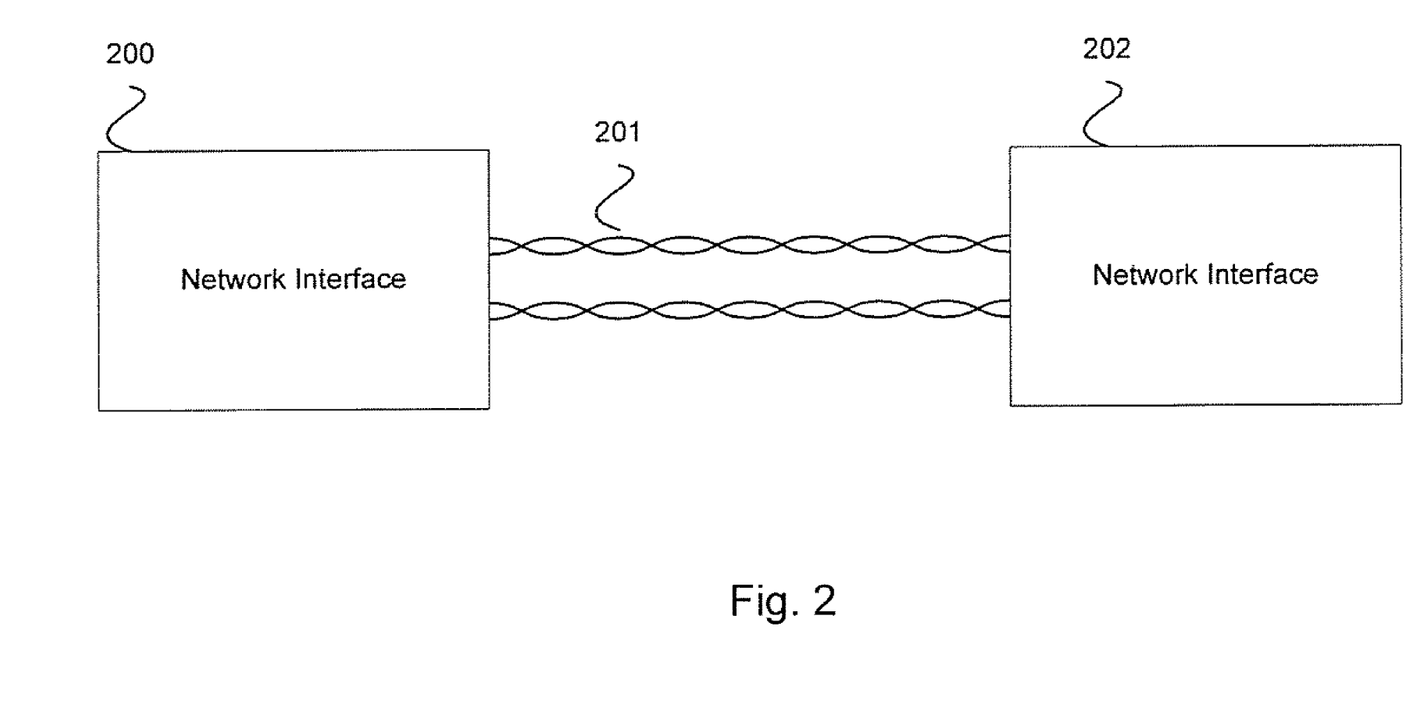
FIG. 2 is a block diagram of two network interface blocks communicating over a pair of twisted pair cables, in connection with an embodiment of the invention.

FIG. 2 is a block diagram of two network interface blocks communicating over twisted pair cables, in connection with an embodiment of the invention. Referring to FIG. 2, shown are network interface blocks 200 and 202 and twisted pair cables 201. The network interfaces 200 and 202 may communicate over the twisted pair cables 201, which communicatively couple each of the network interfaces 200 and 202. Although twisted pair cables 201 are shown, the invention is not limited in this regard, and other medium such as a cable may be utilized.

The network interface blocks 200 and 202 may comprise suitable logic, circuitry, and/or code that may enable equalizing signals and performing timing recovery. Equalization may be necessary to compensate for the effects of channel impairments such as intersymbol interference, which may occur when signals are transmitted through a medium of limited bandwidth. The channel may be characterized as having a particular frequency response. The process of equalization may involve adjusting a plurality of tap-weights of an adaptive filter such that the adaptive filter characteristics are the inverse of the channel filter. Timing recovery may be necessary in order to determine the optimal sampling point of the received signal.

Figure 3:
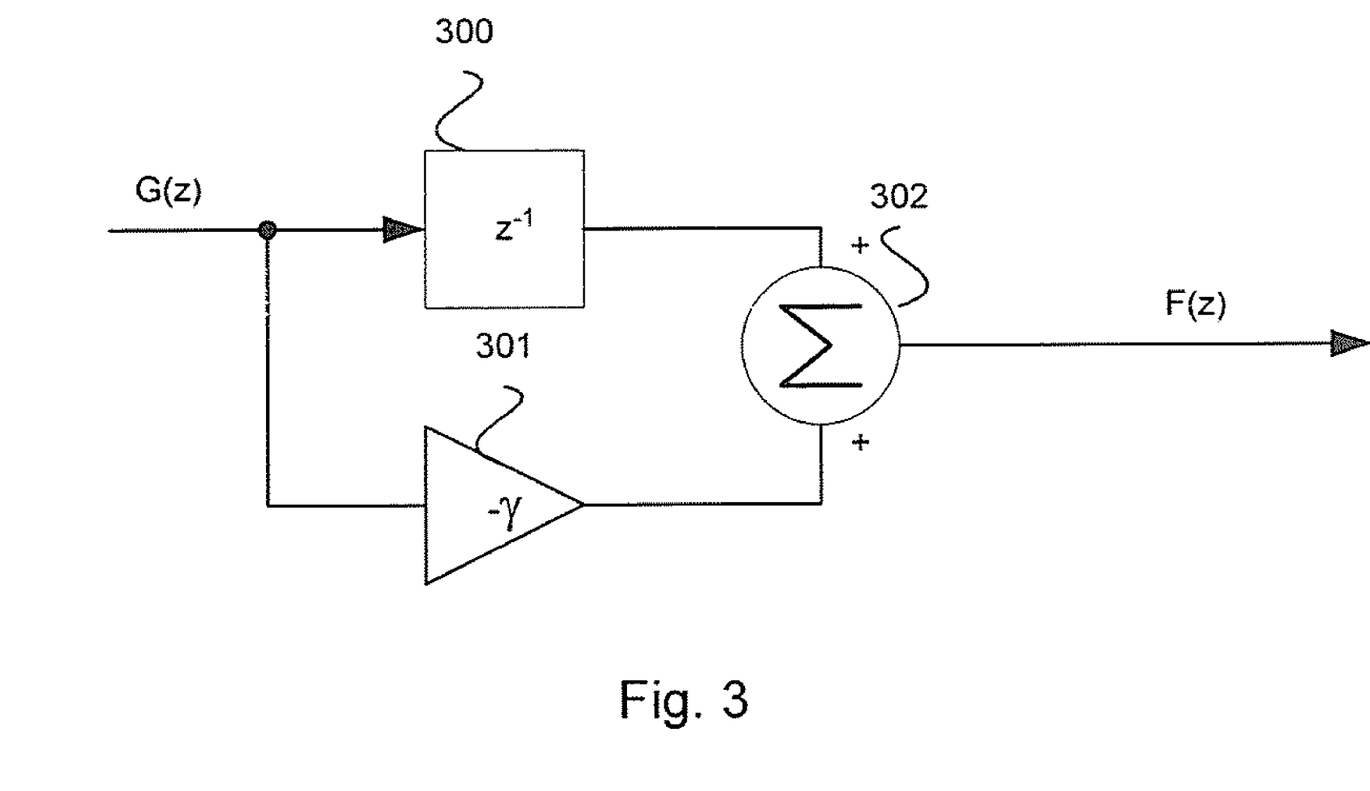
FIG. 3 is a block diagram of a pre-filter for pre-cursor based pulse shaping, in connection with an embodiment of the invention.
Figure 4:
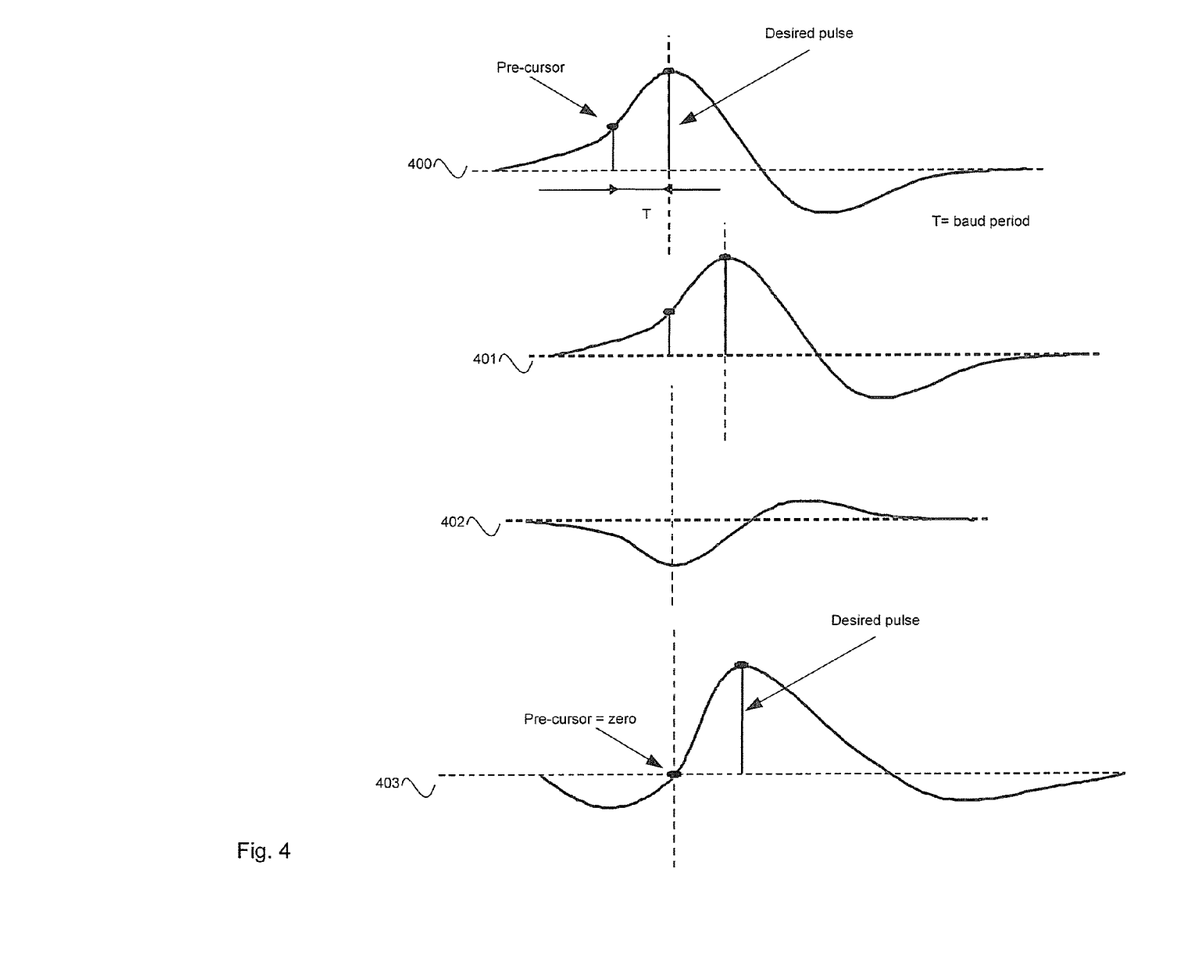
FIG. 4 is a series of waveforms illustrating the filter characteristics of a pre-filter for pre-cursor based pulse shaping, in connection with an embodiment of the invention.

FIG. 3 is a block diagram of a pre-filter for pre-cursor based pulse shaping, in connection with an embodiment of the invention. Referring to FIG. 3, there is shown a delay block 300, a gain block 301, and a summer 302. FIG. 4 is a series of waveforms illustrating the filter characteristics of a pre-filter for pre-cursor based pulse shaping, in connection with an embodiment of the invention. Referring to FIG. 4, there is shown an input pulse 400, a delayed input pulse 401, a scaled and inverted input pulse 402, and a pulse with a zero at the precursor 403.

In operation, the input pulse 400 may be delayed via the delay block 300. The amount of delay may, for example, correspond to the baud rate T of the input pulse 400. The input pulse 400 may also be attenuated and inverted by the factor γ via the gain block 301, resulting in an input pulse scaled by −γ. The delayed input pulse 401 and the scaled and inverted input pulse 402 may then be added together by the summer 302, resulting in a pulse with a zero at the precursor 403.

The pre-filter may be characterized by the following equation:

$$F(z)=(-\gamma+z^{-1})G(z),$$

where G(z) and F(z) are the z-domain representations of the input pulse and output pulse respectively, and γ is an attenuation factor. The factor $(-\gamma+z^{-1})$ may be regarded as a factor that cancels the pre-cursor T seconds before the main sample, and simultaneously it may be seen as introducing a negative precursor at times prior to T seconds before the main sample. This negative pre-cursor may be useful as an indicator of the desired sampling phase and therefore it may be used by a timing recovery system. For example, the pre-cursor may be zero at the proper sampling phase, or it may be negative if the sampling phase is early, or it may be positive if the sampling phase is late.

Figure 5:
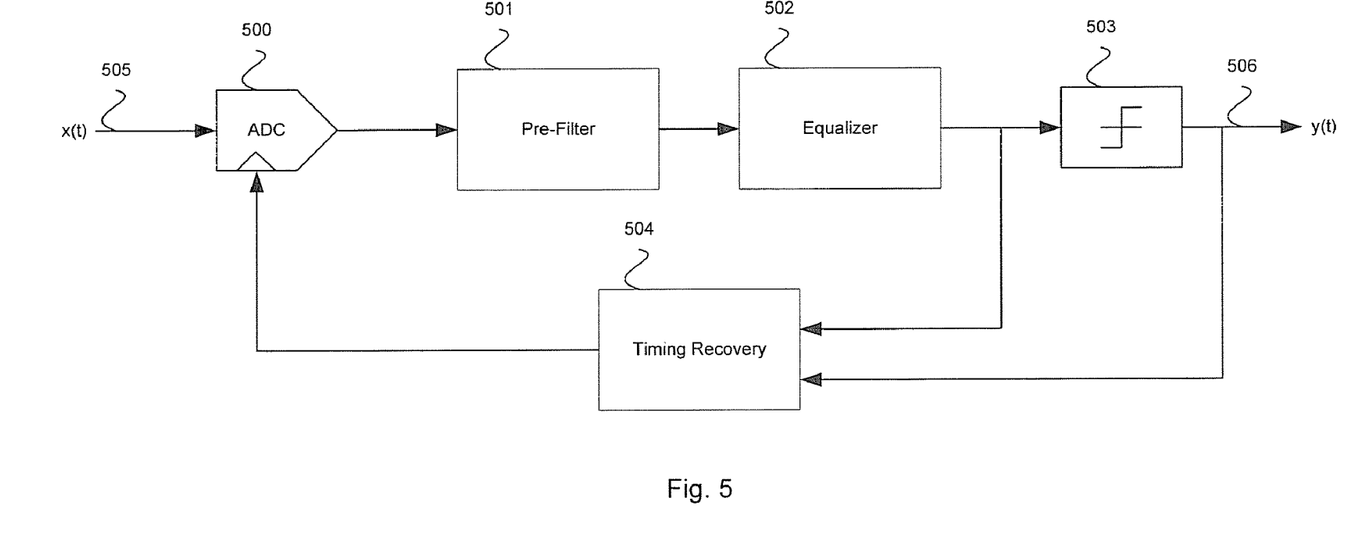
FIG. 5 is a block diagram of a system for joint timing recovery and frequency domain equalization, in connection with an embodiment of the invention.

FIG. 5 is a block diagram of a system for joint timing recovery and frequency domain equalization in connection with an embodiment of the invention. Referring to FIG. 5, the system may comprise an ADC 500, a pre-filter 501, an equalizer 502, a slicer 503 and a timing recovery block 504.

The ADC 500 may comprise suitable logic, circuitry, and/or code that may enable sampling the input signal x(t) and converting the sample into a digital representation of the input signal. The pre-filter 501 may comprise suitable logic, circuitry, and/or code that may enable forcing a zero crossing in a pre-cursor as described above.

The equalizer 502 may comprise suitable logic, circuitry, and/or code that may enable compensating for signal distortion suffered during signal propagation. The equalizer 502 may be a frequency domain adaptive filter that has characteristics similar to those of a finite-impulse-response filter (FIR). Accordingly, the equalizer 502 may have M taps that are adjusted by an adaptation algorithm. The adaptation algorithm may adjust the M taps based on a least-means-square (LMS) algorithm. Once adapted, the filter may then properly compensate for the distortion suffered during signal propagation through the channel. One of the M taps may correspond to a pre-cursor tap. This pre-cursor tap may be forced to zero to prevent the equalizer 502 from compensating for the distortion caused by the pre-filter 501. The output of the equalizer 502 may correspond to discrete samples varying in magnitude from, for example 0 to 255.

The slicer 503 may comprise suitable logic, circuitry, and/or code that may enable quantizing a signal. The slicer 503 may convert a discrete samples from the equalizer 502 into binary signal.

The timing recovery block 504 may comprise suitable logic, circuitry, and/or code that may enable recovery of timing information about signal x(t) 505. The timing recovery block 504 may use, for example, the Mueller/Muller timing recovery algorithm to determine the optimal sampling time of signal x(t) 505. The Mueller/Muller algorithm may operate by taking one sample for every symbol and determining based on the relative amplitudes of those samples the correct frequency of signal x(t) 505. The performance of the timing recovery block 504 may be enhanced as a result of the zero-crossing inserted in the pre-cursor by the pre-filter 501. Also, the convergence time of the close loop system shown in FIG. 5 and controlled by the timing recovery block 504 may be reduced using the pre-filter 501.

In operation, a signal x(t) 505 may be provided as an input to an ADC 500. The sampling signal to the ADC 500 may be derived from the timing recovery block 504. The output of the ADC 500 may be communicatively to a pre-filter 501. The pre-filter 501 may insert a zero-crossing into a pre-cursor so as to enable the timing recovery block 504 to converge to the optimal sample time more quickly. The output of the pre-filter 501 may then be communicated to the equalizer 502 where the signal may be compensated for distortions caused by the channel. The output of the equalizer 502 may be communicated to a slicer 503, where the signal may be quantized into either a one (1) or zero (0). The output of the slicer 503, y(t) 506, and the output of the equalizer 502 may be communicated to the timing recovery block 504, where timing and phase information may be determined and used to generate an optimal sampling time for the ADC 500. The output of the slicer 503 may also be communicated to other systems, such as upper layers of a network protocol stack for further processing.

Figure 6:
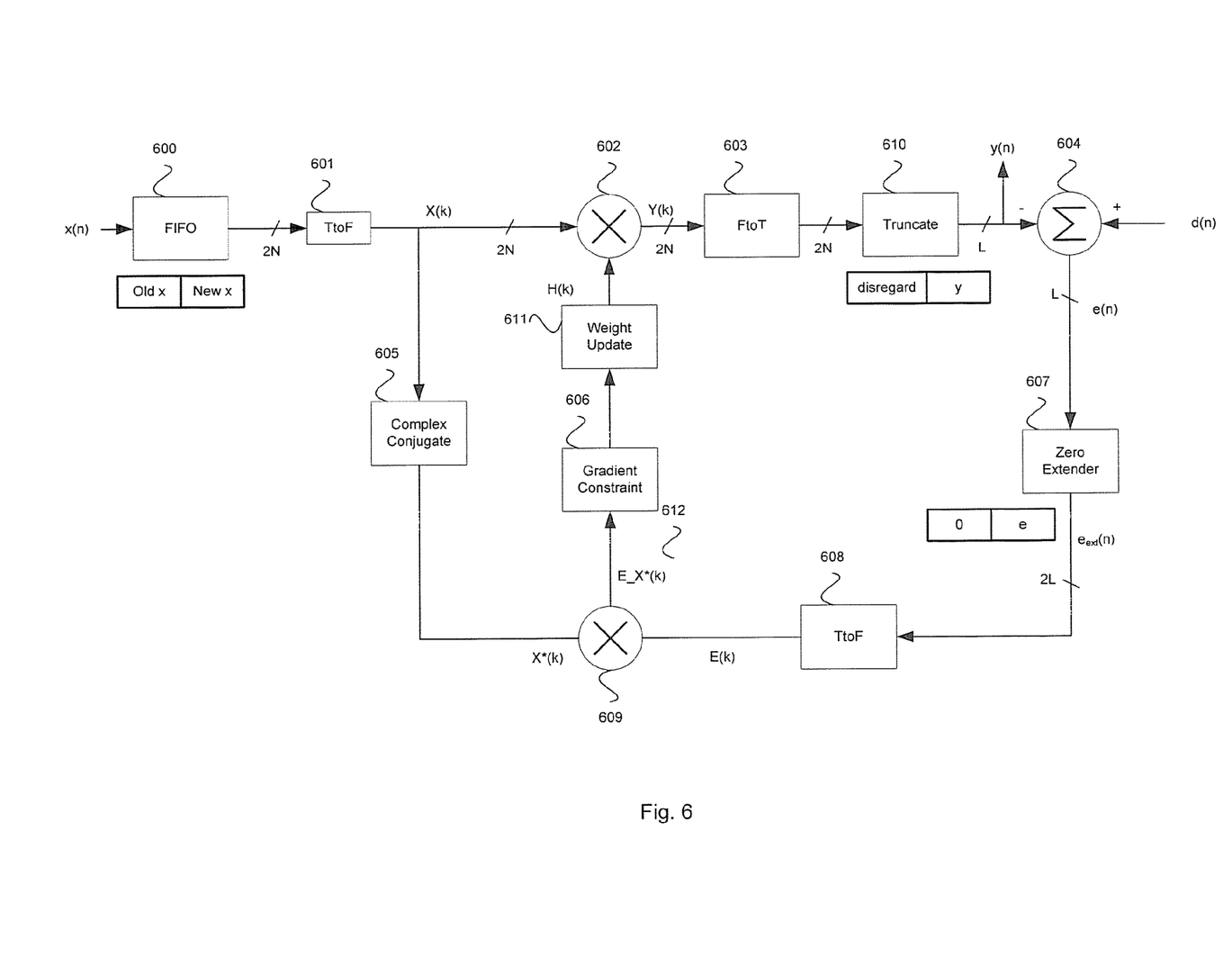
FIG. 6 is a block diagram of a frequency domain adaptive filter, in connection with an embodiment of the invention.

FIG. 6 is a block diagram of a frequency domain adaptive filter, in connection with an embodiment of the invention. Referring to FIG. 6, the filter may comprise a FIFO 600, a plurality of TtoF blocks 601 and 608, a FtoT block 603, a plurality of multipliers 602 and 609, a summer 604, a truncator 610, a zero extender 607, a complex conjugate block 605, a gradient constraint block 606, and a weight update block 611.

The FIFO 600 may comprise suitable logic, circuitry, and/or code that may enable storing samples x(n) into a memory. For example, the FIFO 600 may store 2N samples of x(n) into a memory. The output of the FIFO 600 may be equivalent to a 2N wide bus where each signal of the bus may correspond to an appropriate x(n).

The TtoF blocks 601 and 608 may comprise suitable logic, circuitry, and/or code that may enable converting a block of time domain data into its frequency domain equivalent. The TtoF blocks 601 may perform this function by computing the Discrete Fourier Transform (DFT) algorithm. This algorithm may take the sequence of N complex numbers $x_0, \ldots, x_{N-1}$, and transform the numbers to the sequence of N complex numbers $X_0, \ldots, X_{N-1}$ according to the formula:

$$X_k = \sum_{n=0}^{N-1} x_n e^{-\frac{2\pi i}{N} nk}, k = 0, \ldots, N-1,$$

where e is the base of the natural logarithm, i is the imaginary unit ($i^2=-1$), and $\pi$ is Pi. For example, if the number of time domain samples is 2N, the TtoF blocks 601 and 608 may output 2N values corresponding to the frequency spectrum of the input signal.

The multipliers 602 and 609 may comprise suitable logic, circuitry, and/or code that may enable generation of the product of two vectors together. For example, if X(k), k=0, ..., 2N-1 is a first vector and if H(k), k=0, ..., 2N-1 is a second vector, the product of the two may be Y(k)=X(k)H(k), k=0, ..., 2N-1.

The FtoT block 603 may comprise suitable logic, circuitry, and/or code that may enable converting frequency domain data to its time domain equivalent. The FtoT block 603 may perform this function by computing the Inverse Discrete Fourier Transform (IDFT) algorithm. This algorithm may take the sequence of N complex numbers $X_0, \ldots, X_{N-1}$, and transform the numbers to the sequence of N complex numbers $x_0, \ldots, X_{N-1}$ according to the formula:

$$x_n = \sum_{k=0}^{N-1} X_k e^{-\frac{2\pi i}{N} nk}, n = 0, \ldots, N-1.$$

In the above equation, e is the base of the natural logarithm, i is the imaginary unit ($i^2=-1$), and $\pi$ is Pi. For example, if the number of frequency domain elements is 2N, the FtoT block 603 may output 2N values corresponding to the time domain equivalent of the input signal.

The truncator 610 may comprise suitable logic, circuitry, and/or code that may enable receiving a block of data 2N samples wide and discarding N of those samples. For example, if the input to the truncator 610 is $y_n$, n=0, ..., 2N-1 the truncator 610 may output $y_n$, n=0, ..., N-1 discarding $y_n$, n=N, ..., 2N-1.

The summing block 604 may comprise suitable logic, circuitry, and/or code that may enable addition or subtraction of two vectors together. For example, if $y_n$, n=0, ..., N-1 is a first vector and $d_n$, n=0, ..., N-1 is a second vector the difference may be $e_n=d_n-y_n$, n=0, ..., N-1.

The zero extender block 607 may comprise suitable logic, circuitry, and/or code that may enable extending the width of a received vector. In this regard, if a vector of width N is received, the zero extender 607 may extend the width of the received vector and produce a vector of width 2N. For example, if the input to the zero extender block 607 is $e_n$, n=0, ..., N-1, the zero extender block 607 may output $e_n$, n=0, ..., N-1 and 0 for n=N, ..., 2N-1.

The complex conjugate block 605 may comprise suitable logic, circuitry, and/or code that may enable computing the complex conjugate of a signal. For example, if $x_n$=a+bj, its complex conjugate would be $x_n^*$=a-bj. Referring to FIG. 6, the overlap input vector X(k) from TtoF 601 may be processed by the complex conjugate block 605. The complex conjugate block 605 may then convert X(k) into X*(k), the complex conjugate of the overlap input vector. X*(k) may then be output to multiplier 609.

The gradient constraint block 606 may comprise suitable logic, circuitry, and/or code that may enable computing a vector gradient. The vector gradient may correspond to a set of time domain LMS update values converted into the frequency domain. The update values may be related to an amount of error between a desired signal and an actual signal.

The weight update block 611 may comprise suitable logic, circuitry, and/or code that may enable updating a current set of frequency domain LMS tap weights with a vector gradient. A vector gradient from the gradient constraint block 606 may be input into the weight update block 611 and a filter H(k) may be output from the weight update block 611 and input into a multiplier 602 to compensate for distortions produced by the channel. The LMS tap weights may determine the characteristics of the filter H(k). For every N samples of x(n) input into FIFO 600, the weight update block 611 updates the current LMS tap weights such that distortions detected in the new N samples of x(n) may be compensated.

In operation, time domain signal x(n) may be input into a FIFO 600. The FIFO 600 may output 2N signal representing x(n) to a TtoF 601 where it may be converted into a frequency domain signal X(k) of width 2N. The frequency domain signal, X(k) may then be communicated to a multiplier 602 and multiplied with filter H(k) of width 2N to produce Y(k). The filter H(k) may correspond to a filter capable of compensating for distortions caused by the channel. The signal Y(K), may be communicated to an FtoT 603 where it may be converted to time domain signal y(n) of width 2N. Signal y(n) may be communicated to a truncate block 610 where the first N elements may be stripped off to produce a signal y(n) of width N. Signal y(n) may be communicated to a summing block 604 where it may be subtracted from desired signal d(n) of width N.

The output of the summing block 604 may correspond to an error, e(n), between the desired signal and the actual signal. The signal e(n) may then be communicated to a zero extender block 607 where N zeros may be appended to the beginning of e(n) to produce a signal eext(n) of width 2N. The signal eext(n) may then be converted into the frequency domain by a TtoF 608 to produce signal E(k). E(k) may be communicated to a multiplier 609 where it may be multiplied with X*(k) which may be the complex conjugate of signal X(k).

The output of the multiplier 609 may then be communicated to a gradient constraint block 606, where time domain LMS update values may be computed and converted into frequency domain LMS update values. The output of the gradient constraint block 606 may then be communicated to a weight update block 611, where a new filter H(k) may be computed. This process may be repeated for every N values of x(n) received by the FIFO 600, resulting in a filter H(k) that may be continuously modified so as to compensate for distortions produced by the channel.

Figures 7, 7A:
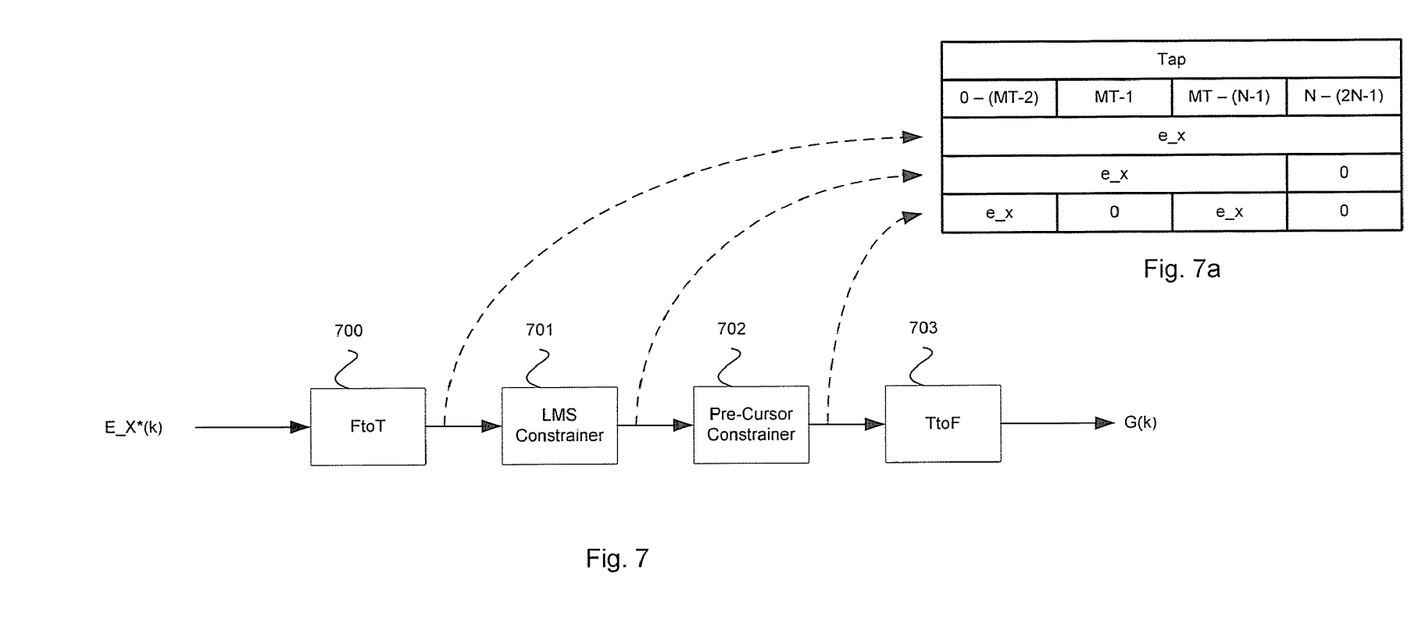
FIG. 7 is a block diagram of a gradient constraint block, in accordance with an embodiment of the invention.
FIG. 7a is a block diagram showing data as it passes through the various blocks in the gradient constraint block, in accordance with an embodiment of the invention.

FIG. 7 is a block diagram of a gradient constraint block, in accordance with an embodiment of the invention, and FIG. 7a is a block diagram showing data as it passes through the various blocks in the gradient constraint block, in accordance with an embodiment of the invention. Referring to FIG. 7, the gradient constraint block 606 (FIG. 6) may comprise a FtoT 700, an LMS constrainer 701, a pre-cursor constrainer 702 and a TtoF 703.

The FtoT blocks 700 may comprise suitable logic, circuitry, and/or code that may enable conversion of frequency domain data to its time domain equivalent. The FtoT block 700 may perform this function by computing the Inverse Discrete Fourier Transform (IDFT) algorithm described above.

The LMS Constrainer 701 may comprise suitable logic, circuitry, and/or code that may enable receiving 2N elements of data and constraining a portion of those elements to zero. Referring to FIG. 7a, if the input to the LMS constrainer 701 is $e\_x_n$, n=0, ..., 2N−1, the LMS constrainer 701 may output $y_n$, n=0, ..., N−1 and 0 for n=N, ..., 2N−1. This may make the frequency domain adaptive filter equivalent to a time domain LMS algorithm with N tap weights.

The pre-cursor constrainer 702 may comprise suitable logic, circuitry, and/or code that may enable setting a pre-cursor tap to zero. Referring to FIG. 7a, the pre-cursor tap may be the tap before the main-tap (MT) or MT −1. Setting the pre-cursor tap to zero may prevent the LMS algorithm from adapting the zero-crossing introduced in the pre-cursor by the pre-filter 501. In this regard, constraining the pre-cursor tap weight may enable using a frequency domain adaptive filter in combination with a timing recovery system, which may be aided by the use of a pre-filter before the equalizer. Without the pre-cursor constrainer 702, the equalizer may compensate for the pre-filter. Thus, any benefit the pre-filter may have produced may be lost. For example, if the Mueller/Muller algorithm is used for timing recovery, the amount of time the algorithm takes to determine the correct timing information may increase. By constraining the pre-cursor tap weight this problem may be mitigated.

The TtoF block 703 may comprise suitable logic, circuitry, and/or code that may enable converting a block of time domain data into its frequency domain equivalent. The TtoF block 703 may perform this function by computing the Discrete Fourier Transform (DFT) algorithm as described above.

In operation, signal $E\_X^*(k)$, representing the error between the filter input signal and a desired signal, is input into a FtoT 700 and converted into time domain signal $e\_x(n)$ of width 2N. The signal is communicated to an LMS constrainer block 701 where the last N elements may be set to zero. The result may be an LMS update value for N tap weights. This signal may then be communicated to a pre-cursor constrainer block 702 where the tap weight corresponding to a pre-cursor may also be set to zero. This may prevent the LMS adaptation algorithm from compensating for the pre-cursor pre-filter. Finally the signal is converted back to the frequency domain by a TtoF block 703. The result may be a frequency domain LMS update value where the pre-cursor tap weight may be constrained.

Figure 8:
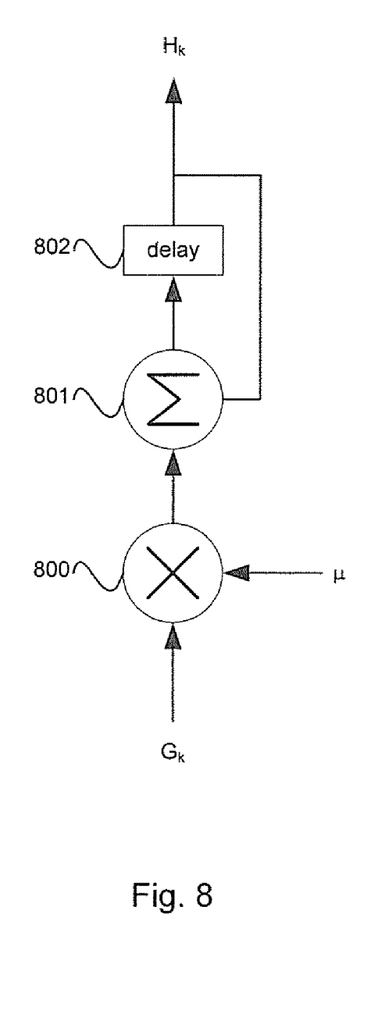
FIG. 8 is a block diagram of the Weight Update block, in accordance with an embodiment of the invention.

FIG. 8 is a block diagram of the weight update block, in accordance with an embodiment of the invention. Referring to FIG. 8, the weight update block 611 (FIG. 6) may comprise a multiplier 800, a summer 801, and a delay element 802. The weight update block 611 may receive a vector gradient signal from the gradient constraint block 606 and may output a signal to a multiplier 602.

The multiplier 800 may comprise suitable logic, circuitry, and/or code that may enable multiplication of the vector gradient signal $G_k$ with constant μ. The constant μ may be chosen so as to control how fast the LMS algorithm adapts to the characteristic frequency response of the channel. If the constant μ chosen is too large, the LMS algorithm may never converge. By contrast if the constant μ chosen is too small the LMS algorithm may take a prohibitively large time to converge. Therefore, the constant μ may be chosen such that the LMS algorithm converges within an appropriate amount of time. The summer 801 may comprise suitable logic, circuitry, and/or code that may enable adding the vector gradient $μG_k$ to the previous filter value $H_k$. The delay element 802 may comprise suitable logic, circuitry, and/or code that may enable delaying the updating of $H_k$ for N samples of input data.

Figure 9:
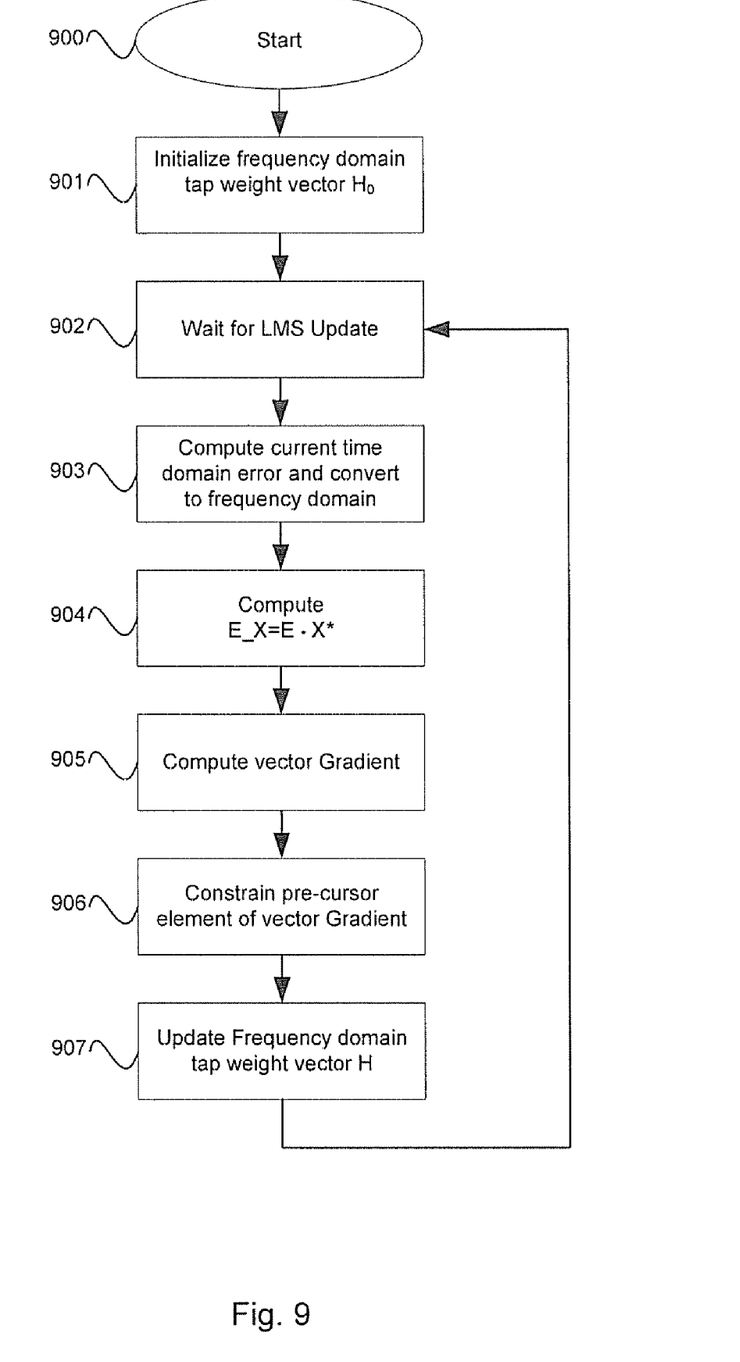
FIG. 9 is a flow diagram illustrating exemplary steps for processing signals in a communication system, in accordance with an embodiment of the invention.

FIG. 9 is a flow diagram illustrating exemplary steps for processing signals in a communication system, in accordance with an embodiment of the invention. Referring to FIG. 9, in step 901 the frequency domain tap weight vector $H_0$ may be initialized by first setting time domain tap weights $h_n$=0 n=0, ..., 2N−1 and setting $h_{maintap}$=initial value and then computing $H_0$=DFT(h). In step 902, the system may wait for the next LMS update. The next LMS update may occur after the next block of N sample of $X_n$ has arrived. In step 903, the LMS errors corresponding to y(n) (FIG. 6) may be computed and padded at the end with N zeros to produce error vector e(n) (FIG. 6). In step 904, error vector e(n) may be transformed to the frequency domain to obtain vector E(k) (FIG. 6). The vector E(k) may then be multiplied with X* where X may represent the overlap input vector to get $E\_X^*(k)$ (FIG. 6). In step 905, $E\_X^*(k)$ may be transformed into the time domain to obtain e_x (FIG. 7), which may be of size 2N. The last N elements of e_x may then be constrained to zero. This becomes the vector Gradient. In step 906, the pre-cursor element gradient (maintap-1) may be constrained to zero. In step 907, the current frequency domain tap weight vector may be updated with the vector gradient to obtain the frequency domain tap weight vector for the next block of N samples of $X_n$.

In operation, timing information about a received signal may be determined by a timing recovery block 504 (FIG. 5). The timing recovery block may be aided by the use of a pre-filter 501 (FIG. 5) which will insert a zero crossing in the pre-cursor. Distortions produced by the channel may have to be compensated by using an equalizer 502 (FIG. 5). The equalizer 502 may compensate for the distortions using a frequency domain equalization process. The compensation process may involve using a time-domain LMS algorithm adapted for use in a frequency domain equalizer (FIG. 6). A pre-cursor tap weight in the adapted time-domain LMS algorithm may be constrained to zero by using a pre-cursor constrainer 702 (FIG. 7) thus preventing the equalizer 502 from compensating for the pre-filter 501. The result may be a system that allows for joint symbol timing recovery and frequency domain equalization for use in a digital communication system.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication system, the method comprising:
constraining, in a timing-recovery system, at least one tap weight of a frequency domain equalizer, said constraining using time domain data corresponding to said at least one tap weight; and
equalizing a signal, in said timing-recovery system based on said frequency domain equalizer that comprises said at least one constrained tap weight.

2. The method according to claim 1, wherein said frequency domain equalizer is a frequency domain adaptive filter.

3. The method according to claim 1, comprising adapting at least one unconstrained tap weight in said frequency domain equalizer using a Least-Mean-Square algorithm.

4. The method according to claim 1, comprising recovering timing information based on a Mueller/Muller timing recovery algorithm.

5. The method according to claim 1, comprising pre-filtering said signal before said equalizing.

6. The method according to claim 1, wherein said at least one constrained tap weight corresponds to a pre-cursor tap weight.

7. The method according to claim 1, wherein said signal is a digital signal.

8. A non-transitory machine-readable storage medium having stored thereon, a computer program having at least one code section for processing signals in a communication system, the at least one code section being executable by a machine for causing the machine to perform steps comprising:
constraining, in a timing-recovery system, at least one tap weight of a frequency domain equalizer, said constraining using time domain data corresponding to said at least one tap weight; and
equalizing a signal, in said timing-recovery system based on said frequency domain equalizer that comprises said at least one constrained tap weight.

9. The non-transitory machine-readable storage medium according to claim 8, wherein said frequency domain equalizer is a frequency domain adaptive filter.

10. The non-transitory machine-readable storage medium according to claim 8, comprising code for adapting at least one unconstrained tap weight in said frequency domain equalizer using a Least-Mean-Square algorithm.

11. The non-transitory machine-readable storage medium according to claim 8, comprising code for recovering timing information based on a Mueller/Muller timing recovery algorithm.

12. The non-transitory machine-readable storage medium according to claim 8, comprising code for pre-filtering said signal before said equalizing.

13. The non-transitory machine-readable storage medium according to claim 8, wherein said at least one constrained tap weight corresponds to a pre-cursor tap weight.

14. The non-transitory machine-readable storage medium according to claim 8, wherein said signal is a digital signal.

15. A system for processing signals in a communication system, the system comprising:
one or more processor and/or circuit in a timing-recovery system, said one or more processor and/or circuit constrains at least one tap weight of a frequency domain equalizer, wherein said constraining uses time domain data corresponding to said at least one tap weight, and wherein said frequency domain equalizer comprising said at least one constrained tap weight equalizes a signal in said timing-recovery system.

16. The system according to claim 15, wherein said frequency domain equalizer comprises a frequency domain adaptive filter.

17. The system according to claim 15, wherein said one or more processor and/or circuit adapts at least one unconstrained tap weight in said frequency domain equalizer using a Least-Mean-Square algorithm.

18. The system according to claim 15, wherein said one or more processor and/or circuit recovers timing information based on a Mueller/Muller timing recovery algorithm.

19. The system according to claim 15, wherein said one or more processor and/or circuit pre-filters said signal before said equalizing.

20. The system according to claim 15, wherein said at least one constrained tap weight corresponds to a pre-cursor tap weight.

21. The system according to claim 15, wherein said signal is a digital signal.

* * * * *